(12) United States Patent
Robibero

(10) Patent No.: US 8,838,475 B2
(45) Date of Patent: Sep. 16, 2014

(54) APPARATUS AND METHOD FOR USING EQUIPMENT REMOTE MONITORING TO GENERATE AUTOMATED PRODUCT SALES OFFERINGS

(75) Inventor: Vincent P. Robibero, Randolph, NJ (US)

(73) Assignee: Inventio AG, Hergiswil (CH)

( * ) Notice: Subject to any disclaimer, the term of this patent is extended or adjusted under 35 U.S.C. 154(b) by 2048 days.

(21) Appl. No.: 09/940,117

(22) Filed: Aug. 28, 2001

(65) Prior Publication Data
US 2003/0046153 A1 Mar. 6, 2003

(51) Int. Cl.
*G06Q 30/00* (2012.01)
*G06Q 30/06* (2012.01)
*G06Q 30/02* (2012.01)

(52) U.S. Cl.
CPC ............ *G06Q 30/02* (2013.01); *G06Q 30/0601* (2013.01); *G06Q 30/0255* (2013.01)
USPC ...................................... 705/14.53; 705/26.1

(58) Field of Classification Search
USPC ........................................ 705/14, 14.53, 26.1
See application file for complete search history.

(56) References Cited

U.S. PATENT DOCUMENTS

| | | | |
|---|---|---|---|
| 4,771,865 A | 9/1988 | Hinderling | |
| 5,404,503 A | 4/1995 | Hill et al. | |
| 5,537,590 A * | 7/1996 | Amado | 1/1 |
| 5,570,291 A * | 10/1996 | Dudle et al. | 700/95 |
| 6,098,032 A | 8/2000 | Brookner | |
| 6,363,359 B1 * | 3/2002 | Gronemeyer et al. | 705/28 |

FOREIGN PATENT DOCUMENTS

| | | |
|---|---|---|
| WO | WO 00/59818 | 10/2000 |
| WO | WO 01/09779 | 2/2001 |

OTHER PUBLICATIONS

J. Palme, A. Hopmann, & N. Shelness, (RFC 2557 "MIME Encapsulation of Aggregate Documents, such as HTML (MHTML)"), Mar. 1999, IETF, http://www.ietf.org/rfc/rfc2557.txt.*
Blake Ives & Michael R. Vitale, After the Sale: Leveraging Maintenance with Information Technology, Mar. 1988, MIS Quartely, vol. 12, No. 1, pp. 7-21.*

* cited by examiner

*Primary Examiner* — John Van Bramer
(74) *Attorney, Agent, or Firm* — Fraser Clemens Martin & Miller LLC; William J. Clemens

(57) ABSTRACT

A method and apparatus for using remote monitoring of customer equipment to generate product sales offers includes an equipment database storing parametric data information related to the operating parameters of the equipment and a product database storing product information related to a plurality of devices and service offered by the service company performing the monitoring. The product information includes limits that are compared with values of the parametric data information in an offer generator to generate a sales offer when the value and the limit have a predetermined relationship. The offer is transmitted to the customer on a web page, by regular mail or e-mail, or by a sales staff of the service company.

22 Claims, 2 Drawing Sheets

APPARATUS AND METHOD FOR USING EQUIPMENT REMOTE MONITORING TO GENERATE AUTOMATED PRODUCT SALES OFFERINGS

BACKGROUND OF THE INVENTION

The present invention relates generally to a method for generating sales offers to customers and, in particular, to an apparatus and method for using customer equipment remote monitoring to generate automated product sales offers to the associated customer.

A business generates sales leads for a product that matches customer needs typically by relying upon customer feedback information gathered and analyzed manually by service technicians, sales persons, account managers and others during direct contact opportunities with current or prospective customers and their equipment. A customer equipment survey is one example of a manual method used currently to help determine opportunities to solicit a sale of a product to a customer. Information gathered from the survey allows the sales organization to assess the state of the customers' equipment and its operating environment. This survey information can be used to match up products that best fit and may be of most interest to the specific customer. Surveys, however, often have the disadvantage of being time-consuming and burdensome to the customer. Surveys also have the disadvantage that the customer may inadvertently provide erroneous or misleading data. Additionally, even the best survey may be flawed, and surveys also take a great deal of time to prepare, conduct and analyze.

Enterprise-wide information database systems are also becoming more common as businesses seek to centralize their data storage and retrieval needs. These database systems typically contain data on customers, products offered for sale, past sales figures, past customer purchases, and inventory on hand, among others. These database systems are utilized to maintain a single storage area for these various types of company-wide data.

In many industries, for example in the elevator service industry, service organizations are being used to maintain their customers' equipment. The U.S. Pat. No. 4,771,865 shows a system that manages multiple elevator installations remotely. The system monitors multiple elevator systems, gathers data, and ultimately transmits the data to a regional exchange to store the data for later analysis or planning. More frequently, these service organizations have been utilizing this type of system to help the service organization maintain and service the equipment being monitored for the customer, and to help improve service productivity. The monitored information is typically parametric data, such as functional, performance, and environmental data. The monitored data is typically transmitted to a central monitoring system and database. These systems for the remote management of elevator installations are well known and allow multiple locations located remotely from each other to be monitored by the central management system.

The amount of data that is monitored, gathered, and stored by these remote management systems can be quite substantial. This data is currently being used only for maintenance management of monitored systems. No method exists in the prior art for utilizing this data, which is a customer's actual use of the monitored equipment, as the basis for generating product sales offers.

It is desirable to have the ability to generate sales offers to customers without the use of surveys or assessments that require manual input from the customer.

It is desirable to utilize the data already being gathered by the remote monitoring systems to generate sales offers to the customers whose equipment is being monitored.

It is desirable to combine the data from a remote monitoring system with data from an enterprise-wide information database system to generate sales offers to customers. It is also desirable to utilize data remotely gathered from monitored equipment and compare the gathered data with customer criteria in order to provide the customer with sales offers based on the performance of the monitored equipment.

It is an object of the invention, therefore, to utilize the data already being gathered by a customer equipment remote monitoring system to generate sales offers to existing customers based on the actual use of their monitored equipment.

SUMMARY OF THE INVENTION

The present invention concerns an apparatus and a method for automatically offering products (devices and services) for sale to customers based upon perceived need. The present invention provides a novel method to automatically generate e-commerce based customer product offerings that are tailored to the specific needs of the customer using information gathered by the remote monitoring of the customer's own equipment.

The present invention obtains from remotely monitored equipment various data related to the operating parameters of the equipment to automatically match up and recommend to a customer a product which best fits a specific customer need. The matched products are automatically offered in sales proposals to the customer along with the value added benefits derived from the monitored data. The present invention provides added value for customers and improves efficiency by reducing the costs in matching product offers for sale to customer needs in the fast growing e-commerce environment.

Implementation of the present invention can be realized in numerous embodiments, and can vary depending on the business objectives and data infrastructure of the organization seeking to automate product offers to prospective customers. For the purpose of illustrating this invention, an example using elevator and escalator service will be used. Although the present invention is described below in the context of elevator and escalator systems, one skilled in the art will recognize that the present invention can be applied to any type of electronic, mechanical, and/or software based equipment.

While monitoring, a remote monitoring system can control and assess many equipment or system parameters, which can later be used to justify a specific product offering or upgrade that would be of interest to a customer. For example, parameters that can be used to determine specific customer product offering opportunities include, but are not limited to, application modifications such as changes in software, mode of operation, and features, usage parameters such as run time, trips per hour, and cycle times, environmental parameters such as temperature changes, utility power, and weather, and equipment performance parameters such as mechanical deterioration.

As noted above, in the elevator service industry, it is becoming more common for service companies to utilize remote monitoring of the elevators and escalators under service to help improve service productivity. In doing so, these service companies are centrally monitoring events, performance and environmental factors on the target elevator or escalator systems under service. This data is typically stored in a central database, or an equipment database.

Moreover, many of these same service companies employ an enterprise-wide information database system, or customer database, which maintains business and customer data. The enterprise-wide system is also typically used to provide data to the service company web site for its customers to view.

The present invention recognizes that relevant target system parameters may be identified that indicate customer needs from parameters that are already being monitored by the remote monitoring system and stored in the equipment database. A novel database can be then created for utilizing these target parameters for the customer's specific installation. The novel database matches new or upgraded product benefits from the enterprise-wide information database system to these target parameters. The matched information is then processed automatically into a proposal for the new product or upgrade for the customer and sent either by mail or over the Internet directly to the customers, or sent internally within the service company to be used as leads by service company sales representatives.

In a preferred embodiment, an elevator system is operated in a normal manner, and is monitored with a remote monitor interface that transmits specific parametric data from the elevator system over a medium to a data concentrator. The data concentrator then transmits the data to a central database called the elevator database, or the equipment database.

The data in the equipment database is characterized or configured so that each monitored characteristic of the equipment has a data value. In addition to the dynamically gathered parametric data described above, the equipment database may also store static data, such as installation dates, equipment model numbers, and the like.

Likewise a product database, which is preferably part of an enterprise-wide information database system, contains products characterized where each characteristic is associated, for cross-referencing purposes, with a set of elevator database characteristics for an installation. Each product characteristic has a limit value representing a threshold or a range. These limit values are used to compare with the relevant monitored equipment parametric data value by an offer generator. The offer generator compares the cross-referenced values in the equipment database with limits in the product database to determine whether offers should be generated. When a data value in the equipment database meets or exceeds a limit value in the product database, the offer generator can generate an offer. The limit values are configured so the offers can be generated with respect to a customer's projected needs, for example an equipment heater sales offer for equipment experiencing ambient temperatures below a predetermined value.

When a match is found, an offer is generated and sent to a customer database where a sales offer is prepared for the specific customer of the monitored elevator. The customer database is also preferably part of an enterprise-wide information database system. Once the offer generator has determined that an offer should be made, it sends the matched data to the customer database. The customer database inserts additional data from the customer database, such as an e-mail address or a web site and combines the equipment, product, and customer data into a sales proposal. In a preferred embodiment, the sales offer is sent to the service company web server for delivery of the offer to a web page that is viewed by the customer. The sales proposal may consist of application modifications related to the type of environment experienced by the equipment, a notification of recent upgrades in parts of the equipment of software, or the like. From the web server, typical e-commerce transactions can be conducted between the customer and the service company. The web page product sales offer, therefore, is based on the customer's actual use of the equipment, and is thus a novel means of providing targeted sales information to customers based on the customer's actual use and projected product needs.

Alternatively, the offer may be sent by regular mail or e-mail directly to the customers, or sent internally within the service company to be used as leads by service company sales representatives.

The present invention may also be configured to inspect more than two data values, because sales offers for certain products will be appropriate when two or more values are met, or within certain predetermined ranges. The number of variations of sales offerings that may be generated by the present invention is limited only by the data in the equipment and customer databases. When new products are added in the product database, the present invention is simply configured to generate sales offers for the new product in the same manner as the older products, which provides great flexibility, expandability, and scalability for generating sales offers. In addition to using threshold values, the present invention contemplates utilizing average values, such as average ambient temperatures to justify heater sales offerings. The present invention also contemplates analyzing the data to determine trends, such as mechanical wear. Sales offers can be based on any number of averages, trends, or threshold values, depending on the product to be sold. The personnel time taken up by creating, gathering, and analyzing survey or assessment data can be spent interfacing with customers based on the output of the present invention. By recognizing that existing databases contain much information on both a customer and the customer's equipment, and utilizing a novel method to generate sales offers without any input required from the customer, the present invention provides a novel method to generate more refined, targeted, and empirically based sales offers in multiple formats.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
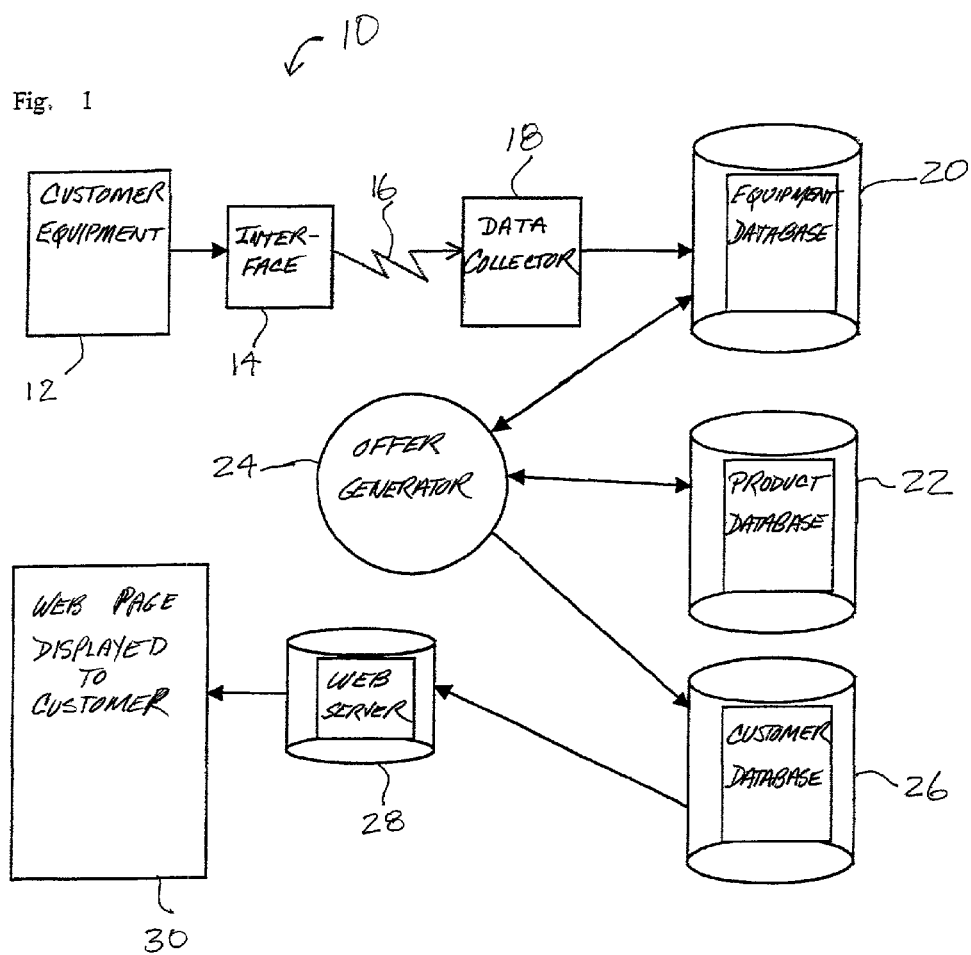
FIG. 1 is a schematic block diagram of an apparatus in accordance with the present invention.

Referring now to FIG. 1, there is shown a sales offer apparatus 10 for using equipment remote monitoring to generate automated sales offerings. The sales offer apparatus 10 utilizes parametric data generated by customer equipment 12 that is operated in a normal manner and is being monitored for service purposes. The equipment 12, for example an elevator system or escalator system, includes components (not shown) performing a plurality of processes that are monitored, for example for control or safety reasons, including mechanical parameters of the elevator or escalator machinery. Each monitored process has at least one data point at which parametric data is generated. Typically the parametric data, whether generated in digital or analog signal form, is converted to a digital format suitable for transmission to a remote monitoring location.

The process operating conditions of the customer equipment 12, represented by the parametric data, are monitored by a remote monitor interface 14 connected to the data points. The parametric data generated by the equipment 12 can include, but is not limited to, functional, performance, and environmental data. The remote monitor interface 14 is preferably part of an existing control or safety system (not shown) installed with the equipment system 12. Alternatively, the remote monitor interface 14 can be a separate unit connected to an existing control or safety system. The remote monitor interface 14 transmits the parametric data from the equipment system 12 via a data transfer means 16 to a remote data collector or concentrator 18. The data transfer means 16 can be any type of data communications device known in the art including, but not limited to, a telephone line, a cable line, a satellite uplink, or the like.

The data collector 18 includes an interface for receiving the parametric data from the data transfer means 16. The data collector 18 is connected to an equipment database 20 for storage of the received parametric data. The data collector 18 and the equipment database 20 can be implemented in a computer system maintained by an equipment service company that is located remotely from the customer equipment system 12 and monitors a number of such systems in a geographic area. The parametric data gathered by the remote monitor interface 14 (parametric data information), specific installation information for the customer equipment 12 (installation information) and information specific to the owner or operator of the customer equipment 12 (customer information) all are stored in the equipment database 20. The data storage structure of the equipment database 20 is conventional and the stored information can be accessed with commercially available database management software. Typically, the equipment database 20 will contain information related to a plurality of customers each having one or more systems being monitored similar to the equipment 12. An example of a data point being monitored is an ambient temperature of an elevator equipment room wherein a temperature value is generated as parametric data from the interface 14 to the data collector 18 and stored in the equipment database 20. The service company typically monitors the value of the temperature reading with a computer to determine whether corrective action should be taken. For example, a too high temperature might require the elevator system to be shut down remotely and a service technician dispatched to locate the problem. A monitoring computer (not shown) connected to the database 20 can signal an operator and/or automatically take the necessary action to shut down the elevator system and dispatch the service technician.

The sales offer system 12 includes a product database 22 that contains information about products (devices and services) offered by the service company (product information). The product database 22 is organized such that each product is associated with, or cross-referenced to, the equipment in the equipment database 20 with which it can be utilized. The product database 22 can be part of an enterprise-wide information database system already being utilized by the service company.

Each product in the product database 22 has an associated threshold value that is used to set a limit for comparison to the corresponding monitored characteristic value in the equipment database 20 by an offer generator 24. For example, a threshold value in the product database 22 for an elevator equipment room heater can be 50 degrees Fahrenheit, which can be associated with to the monitored elevator equipment room ambient temperature being stored in the equipment database 20. As an alternative, the limit may a range that is associated with the performance of the product. Using the heater example, if the room temperature value is in a first range of temperatures, a first model heater having a first heating capacity is indicated, whereas a temperature value in a lower second range of temperatures indicates a second model heater having a higher heating capacity.

The offer generator 24 is software run by a computer that can be the same computer that functions as the data collector 18. The offer generator 24 has access to the information stored in the equipment database 20 and the product database 22. The offer generator 24 compares and analyzes parametric data information (PDI) values from the equipment database 20 with product information limits from the product database 22. If a PDI value from the equipment database 20 matches or exceeds a limit value for an associated product in the product database 22, the offer generator 24 begins the process to generate an offer to a customer. When a match is found, a sales offer is generated and sent to a customer database 26 where the sales offer is stored for transmission to the specific customer of the associated monitored equipment 12. The customer database 26 contains customer information to provide verification that the sales offer contains valid customer and equipment information and to determine a method of transmission of the sales offer to the customer. Thee customer database 26 is also preferably part of an enterprise-wide information database system (not shown) already being utilized by the service company.

The sales offer is sent to a service company web server 28 for delivery of the offer to a web page 30 that is viewed by the customer. The customer can use the web page 30 to order the product (device or service) being offered through typical e-commerce transactions. Alternatively, the sales offer can be sent to the customer by any suitable manner including, but not limited to, regular mail, e-mail and automated voice message. The sales offer could be sent internally within the service company to be used as leads by service company sales representatives or account managers.

The equipment 12, the remote monitor interface 14, the transfer means 16, the data concentrator 18, and the equipment database 20 exist in the typical customer equipment remote monitoring system. Much of the information for the product database 22 and the customer database 26 may exist and is being utilized by the service company in its normal course of business.

Figure 2:
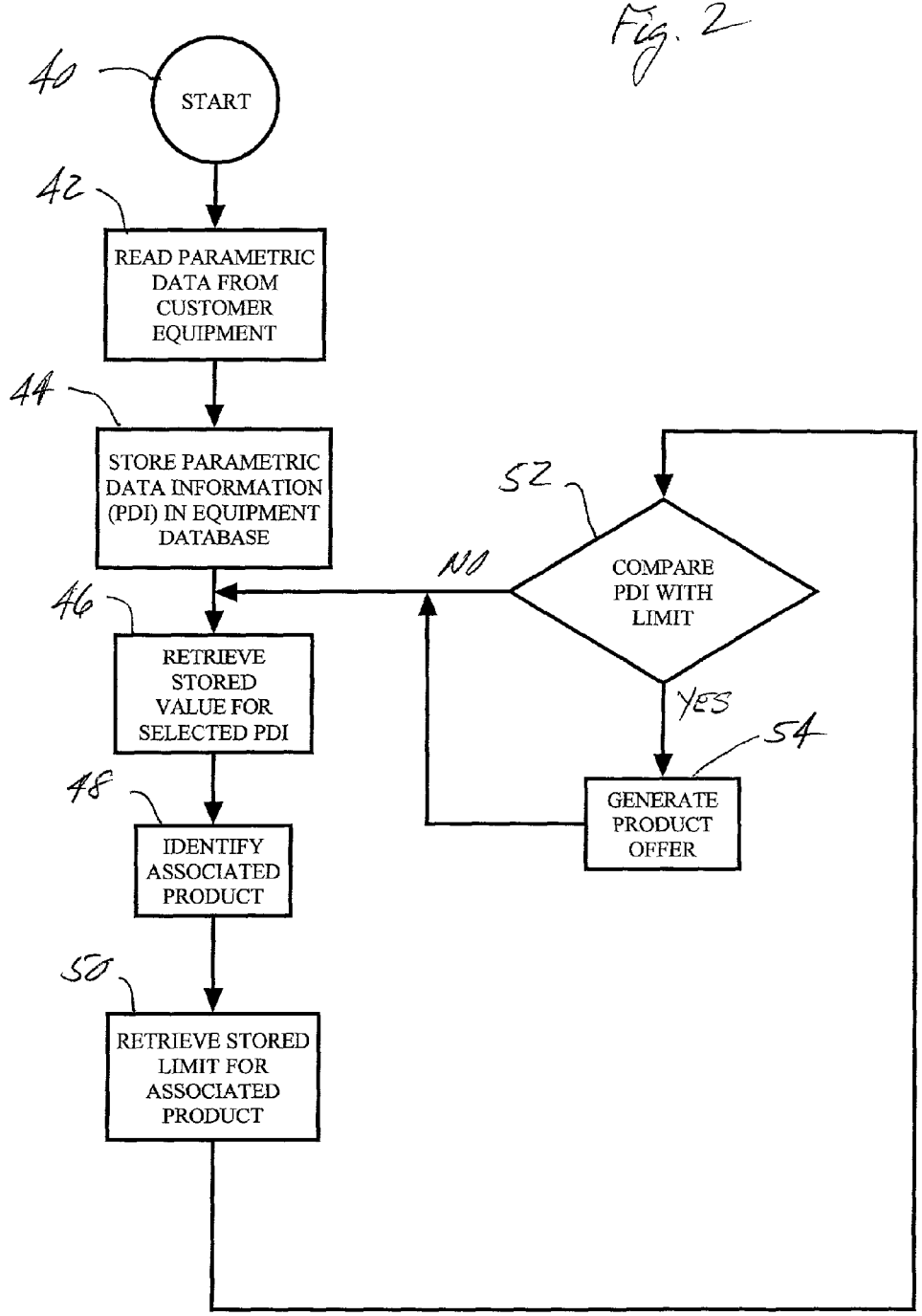
FIG. 2 is a flow diagram of a method in accordance with the present invention.

The method according to the present invention is shown in the FIG. 2. The method begins at Start 40 and enters a Read step 42 wherein parametric data is read from the customer equipment. The parametric data information (PDI) is stored in the equipment database 20 in a Store step 44. The steps 42 and 44 are typically repeated on a regular schedule that is independent of the rest of the method steps.

A stored PDI is selected for comparison and the selected PDI value is retrieved from the equipment database 20 in a Retrieve step 46. Each product (device or service) associated with the selected PDI is identified in an Identify step 48. The stored limit (or range) for each identified product is retrieved from the product database 22 in a Retrieve step 50. Next, the PDI value is compared with each retrieved limit in a Compare step 52. If there is no match because the PDI value does not exceed the limit or fall in the range, the method branches at "NO" back to the Retrieve step 46 where the next PDI is selected for comparison. If there is a match, the method branches at "YES" to a Generate step 54 wherein the offer generator 24 generates an appropriate sales offer to be sent to the customer. The steps 46 through 52 can be performed for a predetermined sequence of the parametric data on cyclic basis, or can be triggered for each parametric data upon a change in the stored value.

In accordance with the provisions of the patent statutes, the present invention has been described in what is considered to represent its preferred embodiment. However, it should be noted that the invention can be practiced otherwise than as specifically illustrated and described without departing from its spirit or scope. Although the present invention has been described in the context of elevator and escalator systems, one skilled in the art will realize that this novel apparatus and method can be applied to any type of electronic, mechanical, and/or software based equipment where monitored data from a customer system is stored by a service provider.

What is claimed is:

1. An apparatus for using data obtained from remote monitoring of customer elevator or escalator equipment for service purposes to generate product sales offers to the customer comprising:

customer elevator or escalator equipment in an elevator installation or an escalator installation generating dynamic parametric data information including electrical and mechanical operating parameters detected by said customer elevator or escalator equipment, said operating parameters including an environmental parameter and an equipment performance parameter, the installation being remotely monitored to receive said dynamic parametric data information on a regular basis for service purposes;

a remote monitor interface located at the installation and connected to said customer elevator or escalator equipment for receiving said dynamic parametric data information as generated;

an equipment database storage device remote from the installation and in communication with said remote monitor interface for receiving said dynamic parametric data information on the regular basis and storing said dynamic parametric data information in a form suitable for determining when to take corrective service action at the installation based upon said dynamic parametric data information;

a product database storage device for storing product information related to characteristics of a plurality of products related to said customer elevator or escalator equipment, said product information for each said characteristic including a limit corresponding to a value of said dynamic parametric data information of an associated one of said operating parameters; and an offer generator connected to said equipment database storage device and to said product database storage device, the offer generator comparing a value of said stored dynamic parametric data information of a selected one of said operating parameters with at least one of said stored product information limits corresponding to said selected one operating parameter, said offer generator generating a sales offer directed to the customer associated with the customer elevator or escalator equipment for a product associated with said limit when said value and said limit have a predetermined relationship representing a maintenance requirement, said sales offer providing the customer with access to a web server enabling the customer to order the product associated with the limit.

2. The apparatus according to claim 1 including a customer database storage device connected to said offer generator for receiving said sales offer and said web server connected to said customer database storage device for sending said sales offer to the customer.

3. The apparatus according to claim 2 wherein said web server generates said sales offer on a web page for viewing by the customer.

4. The apparatus according to claim 2 wherein said web server generates said sales offer as an e-mail message for transmission to the customer.

5. The apparatus according to claim 1 including a customer database storage device connected to said offer generator for receiving said sales offer, said customer database storage device verifying accuracy of said sales offer against customer information stored in said customer database storage device.

6. The apparatus according to claim 1 including a customer database storage device connected to said offer generator for receiving said sales offer, said customer database storage device using customer information stored therein for transmitting said sales offer to the customer.

7. The apparatus according to claim 1 including a data collector connected to said equipment database storage device and data transfer means connected between said remote monitor interface and said data collector for transferring said parametric data information to said equipment database storage device.

8. The apparatus according to claim 1 wherein said product information includes information about devices and services related to said customer elevator or escalator equipment.

9. The apparatus according to claim 1 wherein said limit is a threshold and said predetermined relationship occurs when said value exceeds said threshold.

10. The apparatus according to claim 1 wherein said limit is a range and said predetermined relationship occurs when said value is within said range.

11. The apparatus according to claim 1 wherein said operating parameters include a usage parameter including at least one of run time, trips per hour, and cycle times.

12. The apparatus according to claim 1 wherein said operating parameters further include a usage parameter that is one of run time, trips per hour and cycle times, and the environmental parameter is one of temperature changes, utility power and weather, and and the equipment performance parameter is mechanical deterioration.

13. A method of using data obtained from remote monitoring of customer elevator or escalator equipment for service purposes to generate product sales offers to the customer, comprising the steps of:

a. receiving dynamic parametric data information on a regular basis including an electrical or mechanical operating parameter of customer elevator or escalator equipment in an elevator installation or an escalator installation being remotely monitored on the regular basis for service purposes, said operating parameters including an environmental parameter and an equipment performance parameter detected by said customer elevator or escalator equipment;

b. storing the dynamic parametric data information in an equipment database storage device in a form suitable for determining when to take corrective service action and taking corrective service action at the installation based upon the stored dynamic parametric data information;

c. storing in a product database storage device product information related to a characteristic of at least one product including a limit corresponding to a value of the dynamic parametric data information;

d. comparing by a processor a value of the stored dynamic parametric data information with the limit; and e. generating a sales offer directed to a customer associated with the customer elevator or escalator equipment when the value and the limit have a predetermined relationship representing a maintenance requirement, said sales offer providing the customer with access to a web server enabling the customer to order the at least one product associated with the limit.

14. The method according to claim 13 including a step of storing in a customer database storage device customer information related to the customer and sending the sales offer to the customer based upon the stored customer information.

15. The method according to claim 14 including sending the sales offer to the customer by at least one of regular mail, e-mail and a web page.

16. The method according to claim 14 including using the customer information to verify the accuracy of the sales offer.

17. The method according to claim 13 including a step of monitoring the customer elevator or escalator equipment to generate the parametric data information.

18. The method according to claim 13 wherein said step c. is performed by storing in the product database storage device product information related to characteristics of a plurality of devices and services.

19. The method according to claim 13 including performing said steps a. through e. for a plurality of operating parameters of the customer elevator or escalator equipment, the operating parameters including usage parameter including at least one of run time, trips per hour, and cycle times.

20. An apparatus for using data obtained from remote monitoring of customer elevator or escalator equipment for service purposes to generate product sales offers to the customer comprising:

a data collector for receiving on a regular basis dynamic parametric data information including electrical and mechanical operating parameters of remotely monitored customer elevator or escalator equipment being monitored for service purposes in at least one of an elevator installation and an escalator installation, said operating parameters including an environmental parameter and an equipment performance parameter detected by said customer elevator or escalator equipment, said data collector being located remote from the installation and said dynamic parametric data information being suitable for the service purposes;

an equipment database storage device in communication with said data collector for receiving on the regular basis and storing said dynamic parametric data information in a form suitable for determining when to take a corrective service action at the installation;

a product database storage device for storing product information related to characteristics of a plurality of products related to the customer elevator or escalator equipment, said product information for each said characteristic including a limit corresponding to a value of said dynamic parametric data information of an associated one of said operating parameters;

an offer generator connected to said equipment database storage device and to said product database storage device, the offer generator comparing a value of said stored dynamic parametric data information of a selected one of said operating parameters with at least one of said stored product information limits corresponding to said selected one operating parameter, said offer generator generating a sales offer directed to the customer associated with the customer elevator or escalator equipment for a product associated with said limit when said value and said limit have a predetermined relationship representing a maintenance requirement, said sales offer providing the customer with access to a web server enabling the customer to order the product associated with the limit;

a customer database storage device connected to said offer generator for receiving said sales offer; and said web server connected to said customer database storage device for sending said sales offer to the customer.

21. The apparatus according to claim 20 wherein said operating parameters include a usage parameter including at least one of run time, trips per hour, and cycle times.

22. The apparatus according to claim 20 wherein said operating parameters include at least one of a usage parameter that is one of run time, trips per hour and cycle times, an environmental parameter that is one of temperature changes, utility power and weather, and an equipment performance parameter that is mechanical deterioration.

* * * * *